Jan. 27, 1959     W. J. SCHMIDT ET AL     2,871,448
ALTERNATING CURRENT RESPONSIVE DEVICES
Filed Dec. 1, 1954

WITNESSES:
E. A. M*Closkey.
David M. Schiller

INVENTORS
Warren J. Schmidt
and Frederick V. Kadri.
BY C. L. Freedman
ATTORNEY

United States Patent Office 2,871,448
Patented Jan. 27, 1959

2,871,448

ALTERNATING CURRENT RESPONSIVE DEVICES

Warren J. Schmidt, Bloomfield, and Frederick V. Kadri, Madison, N. J., assignors to Westinghouse Electric Corporation, East Pittsburgh, Pa., a corporation of Pennsylvania Application December 1, 1954, Serial No. 472,457

3 Claims. (Cl. 324—138)

This invention relates to alternating current responsive devices and has particular relation to means for establishing a predetermined phase relationship between the magnetic flux components of a shifting magnetic field present in such devices.

For purposes of discussion, the invention will be described in connection with induction type watthour meters, although the invention is applicable to other devices, such as induction relays.

Watthour meters have previously been constructed which include voltage and current electromagnets effective when energized to produce alternating voltage and current magnetic fluxes. The electromagnets are arranged so that the magnetic fluxes cooperate to establish a shifting magnetic field for influencing an associated electroconductive armature.

In order to establish a predetermined phase relationship between the voltage and current magnetic fluxes, conventional watthour meters are ordinarily provided with a flux lagging member for lagging one or both of the magnetic fluxes. Such a lag member is ordinarily in the form of an electroconductive plate positioned in the path of one or both of the magnetic fluxes to lag the desired flux. The lag member is generally rendered adjustable for varying the lag effect thereof. An example of a prior art lag member will be found in the R. M. Leippe Patent 2,512,345.

In certain cases, the lag effect produced by the lag member may not be sufficient to provide a desired phase relationship between the magnetic fluxes. Such a situation may occur, for example, when a number of lag members of identical design are maintained in stock for use with watthour meters which exhibit different performance characteristics.

In accordance with the present invention, a watthour meter is provided which includes a plurality of independent lag members arranged to provide a desired lag effect. Preferably, at least one of the lag members is rendered adjustable to provide a variable lag effect.

According to a specific embodiment of the invention, a pair of independent lag members is provided with each of the lag members being positioned in the path of the voltage magnetic flux to lag the voltage flux. One of the lag members is adjustable to provide a variable lag effect. The other lag member is arranged so as to provide a constant lag effect for supplementing the lag effect of the adjustable lag member.

Conventional watthour meters are commonly provided with a magnetic shunt assembly for the purpose of controlling the load response of the meter. Such a shunt assembly ordinarily includes a magnetic member which is positioned between the current magnetic poles of the meter to shunt a portion of the current magnetic flux away from the associated electroconductive armature. According to the invention, one of the lag members is conveniently carried by the magnetic shunt assembly for positioning in the path of the voltage flux to lag the voltage flux.

In accordance with a specific embodiment of the invention, one of the lag members is supported solely by the magnetic shunt member in the path of the voltage flux. This lag member conveniently is in the form of a layer of electroconductive material adhering directly to a surface of the magnetic shunt. The electroconductive layer may be applied to the shunt in any suitable manner. Preferably, the shunt is formed from a sheet of magnetic material having a layer of electroconductive material bonded to a surface of the magnetic material by a conventional cladding operation.

It is, therefore, an object of the invention to provide an induction instrument having improved means for establishing a predetermined phase relationship between the magnetic flux components of a shifting magnetic field of the instrument.

It is another object of the invention to provide a watthour meter including a plurality of independent flux lag members associated with the current electromagnet of the meter to lag the voltage flux of the meter.

It is a further object of the invention to provide a watthour meter including a magnetic shunt and a flux lag member carried by the magnetic shunt in a fixed position to lag the voltage flux of the meter.

It is still another object of the invention to provide a watthour meter including a magnetic shunt having a layer of electroconductive material adhering directly to the shunt for lagging the voltage flux of the meter.

It is a still further object of the invention to provide a watthour meter with means for establishing a predetermined phase relationship between the voltage and current fluxes of the meter including a main lag member arranged to provide an adjustable lag effect and an auxiliary lag member arranged to provide a constant lag effect for supplementing the adjustable lag effect.

Other objects of the invention will become apparent from the following detailed description taken in conjunction with the accompanying drawing, in which.

Figure 1:
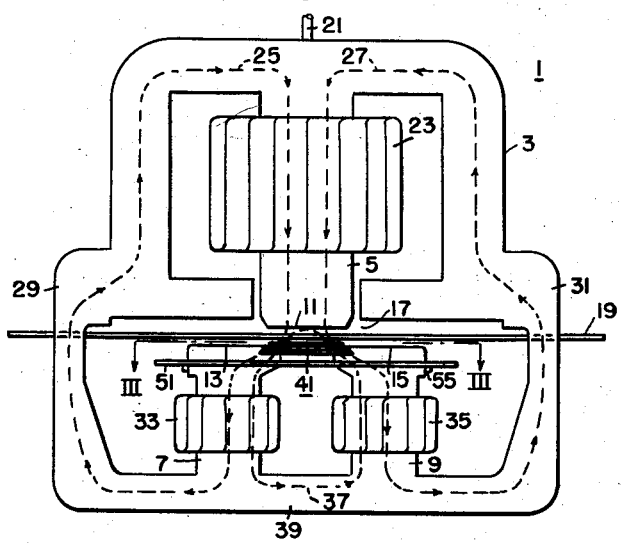
Figure 1 is a view in front elevation of a watthour meter embodying the invention.

Referring now to the drawing, Figure 1 illustrates a watthour meter 1 of the induction type embodying the teachings of the invention. As there shown, the meter 1 includes a magnetic structure 3 which is conveniently formed of a plurality of identical magnetic laminations 4 each having the configuration illustrated in Fig. 1. The laminations 4 may be constructed of any suitable magnetic material, such as silicon steel.

The structure 3 includes a voltage magnetic pole 5 and a pair of spaced current magnetic poles 7 and 9. The voltage pole 5 has a pole face 11 and the current poles 7 and 9 have respectively pole faces 13 and 15. It is observed with reference to Fig. 1 that the pole faces 13 and 15 are disposed in a common plane which is parallel to and spaced from the plane of the pole face 11 to define an air gap 17. An electroconductive armature in the form of a disc 19 is mounted for rotation by a shaft 21 through the air gap 17.

In order to direct magnetic flux through the air gap 17, the voltage pole 5 is surrounded by a voltage winding 23. When the winding 23 is energized from a source of alternating voltage, an alternating voltage flux is established which traverses the air gap 17 and the disc 19 positioned in the gap 17. Such magnetic flux is represented in Fig. 1 by the dotted lines 25 and 27 which have small arrows associated therewith to indicate an instantaneous direction of flux flow.

It is noticed that the flux represented by the dotted line 25 passes through the voltage pole 5 and traverses the gap 17 and the disc 19 to enter the current pole 7. This flux then returns to the voltage pole 5 through a left-hand arm 29 of the structure 3 as viewed in Fig. 1. In a similar manner, the flux 27 passes through the gap 17 in the disc 19 to enter the current pole 9. This flux then returns to the voltage pole 5 through a right-hand arm 31 of the structure 3.

Current windings 33 and 35 are provided to surround respectively the current poles 7 and 9. The windings 33 and 35 are connected in series and are oppositely poled so that when the winding 33 directs a magnetomotive force downwardly in the current pole 7, the winding 35 establishes an equal upwardly directed magnetomotive force in the current pole 9. The resulting flow of magnetic flux is represented in Fig. 1, in part, by a dotted line 37 which has an instantaneous direction as represented by an associated arrow.

As shown in Fig. 1, the flux represented by the dotted line 37 enters the air gap 17 from the current pole 9, bends upwardly toward the pole 5 to traverse the disc 19, and bends downwardly to again cross the disc 19. The flux then enters the current pole 7 and returns to the current pole 9 through a part 39 of the structure 3.

Figure 2:
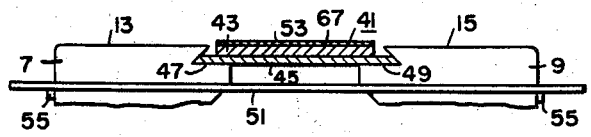
Fig. 2 is an enlarged view in front elevation of a portion of the meter of Fig. 1.

For the purpose of controlling the load response of the meter 1, a magnetic shunt assembly, represented generally by the numeral 41, is provided. As best shown in Fig. 2, the shunt assembly 41 includes a magnetic shunt 43 which is positioned between the current poles 7 and 9 adjacent the pole faces 13 and 15. The shunt 43 may be formed of any suitable magnetic material, such as iron or cold rolled steel, and is preferably spaced from the current poles 7 and 9 by means of a spacer 45 constructed of a suitable non-magnetic material such as brass or fiber. The spacer 45 may be secured to the shunt 43 in any desired manner. The shunt 43 is designed to saturate within the operating range of load current of an associated circuit.

The current poles 7 and 9 are conveniently provided with ledges 47 and 49 defining dove-tailed slots of the poles 7 and 9 for frictionally receiving the spacer 45 for the purpose of removably supporting the shunt assembly 41. As is understood in the art, the shunt 43 is effective to divert a portion of the current magnetic flux away from the air gap 17 to thereby improve the load response of the meter.

The parts of Fig. 1 which thus far have been specifically described are all well known and understood in the art. For this reason, an extended discussion of the parts thus far described is believed unnecessary.

When the windings 23, 33 and 35 are energized, it is desirable that the magnetic fluxes established thereby which traverse the gap 17 have a predetermined phase relationship. For a watthour meter, this phase relationship should be such that at unity power factor of an associated circuit (not shown) the two magnetic fluxes are in quadrature. Although the voltage winding 23 may have a large number of turns to provide substantial inductance for lagging the voltage flux substantially behind the voltage applied to the winding 23, such lagging does not suffice to establish the desired quadrature relationship inasmuch as the winding 23 is ordinarily constructed of copper wire and has some electrical resistance.

In order to establish the desired phase relationship between the voltage and current fluxes, conventional watthour meters are provided with a lagging or quadrature member positioned to lag one or both of the magnetic fluxes as is well understood in the art. Such a lag member is ordinarily arranged for adjustment to provide an adjustable lag effect. The adjustment may be effected either by mounting the lag member for physical movement relative to the associated magnetic structure, or by varying the electrical resistance of a fixed lag member.

In certain situations, the lag effect provided by the lag member may be insufficient to establish the desired phase relationship between the current and voltage fluxes. Such a situation may arise, for example, when a number of lag members of identical design are stocked for use with meters which, for some reason, exhibit different performance characteristics. The different performance characteristics may be the result of intentional variations in design for meters of different load ratings or of unintentional variations in the construction and assembly of meters of identical design.

In accordance with the present invention, a plurality of independent and distinct lag members are provided for the purpose of establishing a desired phase relationship between the current and voltage fluxes of the meter 1. Preferably, at least one of the lag members is rendered adjustable for providing a variable lag effect. These lag members may be located at any position to intercept or surround the desired magnetic flux for lagging such flux.

Figure 3:
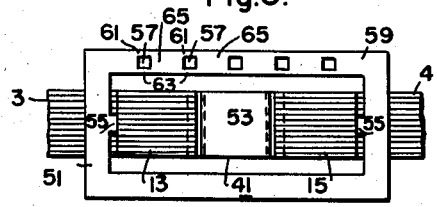
Fig. 3 is a view taken along the line III—III of Fig. 1.

In the specific embodiment of Fig. 1, a pair of independent lag members 51 and 53 is provided. The members 51 and 53 may be of any suitable construction. In the specific embodiment of the invention, the member 51 is in the form of a hollow rectangle to present a closed path to current flowing through the member 51 as best shown in Fig. 3. The member 51 may be constructed of any suitable electroconductive material, such as copper or aluminum.

The member 51 is preferably positioned to surround the current poles 7 and 9 adjacent the air gap 17 for the purpose of intercepting the voltage flux to lag the voltage flux. Such location of the member 51 is desirable in that it permits provision of an air gap 17 of minimum length and prevents the induction of voltage in the member 51 by action of the alternating current flux which might adversely affect the lagging of the voltage flux by the member 51. The member 51 is conveniently secured to the current poles 7 and 9 by means of integral lugs 55 which are struck down from the member 51 to engage sides of the current poles 7 and 9.

The lag member 51 is preferably rendered adjustable in order to provide a variable lag effect. To this end the member 51 may be constructed in the manner disclosed in application Serial No. 419,972, filed by A. J. Petzinger on March 31, 1954, and assigned to the Westinghouse Electric Corporation.

According to such construction, the member 51 is provided with a plurality of openings 57 spaced along a portion 59 of the member 51 as best shown in Fig. 3. The openings 57 define a plurality of parallel paths 61 and 63 which are connected in series relationship by bridges 65. By interrupting one or the other of the paths 61 and 63 at selected points intermediate the bridges 65, the effective length and cross-section of the current path presented by the member 51 and, consequently, the electrical resistance of such path may be varied.

According to the invention, an auxiliary lag member 53 is provided for supplementing the lag effect produced by the member 51. The member 53 may be of any suitable construction and may be positioned to intercept one or both of the current and voltage fluxes to lag the desired flux.

In the specific embodiment of Fig. 1, the lag member 53 is conveniently associated with the magnetic shunt assembly 41 for positioning directly beneath the voltage pole 5 to intercept the voltage magnetic flux to lag the voltage flux.

As best shown in Fig. 2, the lag member 53 engages a surface 67 of the magnetic shunt 43 which is positioned directly beneath and adjacent to the voltage pole 5. It is observed with reference to Fig. 1 that with such positioning of the member 53, the member 53 intercepts portions of the voltage flux represented by the dotted lines 25 and 27 to effect the lagging of the voltage flux. The member 53, however, has substantially no effect upon the current flux.

The member 53 may be of any suitable formation. According to the invention, the member 53 is in the form of a layer of electroconductive material of low resistivity, such as copper, which engages the surface 67 of the shunt 43 to adhere directly to the surface 67. The layer 53 may be applied to the shunt 43 in any desired manner. For example, the layer 53 may be applied to the surface 67 as by an electroplating process. Preferably, however, a preformed sheet of the desired magnetic material for the shunt 43 is provided which has a layer of suitable electroconductive material bonded to one surface thereof by a conventional cladding operation. The shunt 43 may then be stamped from the preformed sheet with the desired dimensions and configuration. The thickness of the bonded electroconductive layer is selected to permit formation of a shunt which exhibits the desired lag effect.

Satisfactory results have been obtained with the layer 53 located at other positions in the assembly 41 than that shown in Fig. 2. For example, good results have been realized with the layer 53 positioned between the shunt 43 and the spacer 45. To this end, the shunt 43 may be positioned with the layer 53 thereof beneath the shunt as viewed in Fig. 2. Alternatively, the layer 53 may be omitted from the shunt 43 and incorporated with the spacer 45 for positioning between the shunt and the spacer.

In certain installations, the spacer 45 may be omitted entirely and replaced by a layer of electroconductive non-magnetic material designed to serve both as a spacer for the shunt 43 and a lag member for the voltage flux. When the spacer 45 is employed the entire shunt assembly including the shunt 43, the spacer 45 and the layer 53 may be formed by stamping from a composite sheet a piece of the desired dimensions and configuration. The composite sheet may conveniently be formed of three bonded laminations of suitable material arranged in the desired relation with one another.

In certain installations the spacer 45 may be formed of a non-magnetic material having some electrical conductivity. For example, the spacer may be constructed of brass having a resistivity of approximately 7 microhms per cm. cube at 20° C. Such a spacer does not provide as satisfactory a lag effect as the layer 53 which is preferably constructed of copper having a resistivity of approximately 1.7 microhms per cm. cube at 20° C.

By means of the invention it is possible for a manufacturer to maintain in stock a number of adjustable lag members of identical design, such as the member 51, for use with meters which exhibit different performance characteristics. The lag member 53 is constructed so as to require very little space and is positioned so as not to interfere with the operation of the meter 1. The invention permits the shunt assembly 41 and the lag member 53 to be assembled as a unit and installed in the magnetic structure 3 and removed therefrom as a complete unit.

Furthermore, the same mechanical operations employed to form the shunts 43 having the layer 53 associated therewith may also be utilized to construct shunts 43 which do not have the layer 53 adhering thereto since the shunts may conveniently be stamped from a sheet of the desired magnetic material with or without the layer 53 bonded thereto. The shunts may then be machined or otherwise prepared to provide a finished shunt.

Although the invention has been described with reference to certain specific embodiments thereof, numerous embodiments thereof are possible, and it is desired to cover all embodiments falling within the spirit and scope of the invention.

We claim as our invention:

1. In an alternating current induction instrument, a magnetic structure including a first magnetic pole having a first pole face and a pair of spaced second magnetic poles having second pole faces, said second pole faces defining a common plane which is spaced from and parallel to the plane of the first pole face to define an air gap, a first winding surrounding the first pole effective when energized for producing an alternating first flux, second windings surrounding the second poles effective when energized for producing an alternating second flux cooperating with the first flux to establish a shifting magnetic field in the air gap, an electroconductive armature mounted for rotation through the air gap under the influence of the shifting magnetic field, a magnetic shunt positioned between said second poles for shunting a portion of the second flux away from the air gap, a non-magnetic spacer positioned to space the magneic shunt from the second poles, and means for controlling the phase relationship between the first and second fluxes, said last-named means including a pair of spaced independent electroconductive members, one of said members being positioned in the path of the first flux to lag the first flux, said one of said members being adapted for adjustment to provide a variable lag effect, the other of said members being carried by the magnetic shunt in fixed relation with the magnetic structure for intercepting the first flux to lag the first flux, said other of said members being formed of a material having a resistivity less than 3 microhms per cm. cube at 20° C. which is different from the resistivity of the non-magnetic spacer.

2. In an alternating current induction meter, a magnetic structure including a first magnetic pole having a first pole face and a pair of spaced second magnetic poles having second pole faces, said second pole faces defining a common plane which is spaced from and parallel to the plane of the first pole face to define an air gap, a first winding surrounding the first pole effective when energized for producing an alternating first flux, second windings surrounding the second poles effective when energized for producing an alternating second flux cooperating with the first flux to establish a shifting magnetic field in the air gap, an electroconductive armature mounted for rotation through the air gap under the influence of the shifting magnetic field, a magnetic shunt assembly positioned between said second poles for shunting a portion of the second flux away from the air gap, said magnetic shunt assembly including a magnetic shunt having a pair of opposed surfaces positioned in spaced planes parallel to the plane of the first pole face with one surface nearer to the first pole face than the other surface, and means for controlling the phase relationship between the first and second fluxes, said last-named means comprising an electroconductive member positioned in the path of the first flux to lag the first flux, said member being adapted for adjustment to provide a variable lag effect, and a layer of electroconductive material adhering directly to said one surface in the path of the first flux to lag the first flux.

3. In an alternating current watthour meter, a magnetic structure including a voltage magnetic pole having a voltage pole face and a pair of spaced current magnetic poles having current pole faces, said current pole faces defining a common plane which is spaced from and parallel to the plane of the voltage pole face to define an air gap, a voltage winding surrounding the voltage pole effective when energized for producing an alternating voltage flux, current windings surrounding the current poles effective when energized for producing an alternating current flux cooperating with the voltage flux to establish a shifting magnetic field in the air gap, an electroconductive armature mounted for rotation through the air gap under the influence of the shifting magnetic field, a magnetic shunt assembly positioned between said current poles for shunting a portion of the current flux away from the air gap, said shunt assembly including a magnetic shunt having a pair of opposed surfaces positioned in spaced planes parallel to the plane of the voltage pole face with one surface nearer to the voltage pole face than the other surface, and means for controlling the phase relationship between the voltage and current fluxes, said last-named means comprising a first electroconductive member surrounding said current poles in the path of the voltage flux to lag the voltage flux, said first member being adapted for adjustment to provide a variable lag effect, and a second electroconductive member in the form of a layer of electroconductive material adhering directly to said one surface to define with the voltage pole face a portion of the air gap to lag the voltage flux.

References Cited in the file of this patent

UNITED STATES PATENTS

| | | |
|---|---|---|
| 1,180,795 | Pratt | Apr. 25, 1916 |
| 2,146,606 | Trekell | Feb. 7, 1939 |
| 2,169,028 | Leippe | Aug. 8, 1939 |
| 2,259,285 | Barnes | Oct. 14, 1941 |
| 2,313,951 | Leippe | Mar. 16, 1943 |
| 2,512,345 | Leippe | June 20, 1950 |